United States Patent [19]

Ogurtsov et al.

[11] Patent Number: 5,715,025
[45] Date of Patent: Feb. 3, 1998

[54] ACTIVE MATRIX FOR LIQUID CRYSTAL DISPLAYS IN WHICH A DATA BUS CONSISTS OF TWO DATA SUBBUSES AND EACH DATA SUBBUS IS SEPARATED FROM AN ADJACENT DATA BUS BY ONE DISPLAY ELECTRODE

[75] Inventors: Oleg F. Ogurtsov; Boris I. Kazurov; Boris P. Chernorotov, all of Moscow, Russian Federation

[73] Assignee: Goldstar Co., Ltd., Seoul, Rep. of Korea

[21] Appl. No.: 166,873

[22] Filed: Dec. 15, 1993

[30] Foreign Application Priority Data

Feb. 22, 1993 [RU] Russian Federation ............. 93009871

[51] Int. Cl.⁶ .................. G02F 1/136; G02F 1/1335
[52] U.S. Cl. .................. 349/41; 349/42; 349/106
[58] Field of Search .................. 359/58–60, 68, 359/87; 345/90, 93, 104; 349/41, 42, 106

[56] References Cited

U.S. PATENT DOCUMENTS

| | | | |
|---|---|---|---|
| 4,368,523 | 1/1983 | Kawate | 359/59 |
| 4,781,438 | 11/1988 | Noguchi | 359/68 |
| 4,820,222 | 4/1989 | Holmberg et al. | 345/93 |
| 4,822,142 | 4/1989 | Yasui | 359/59 |
| 4,931,787 | 6/1990 | Shannon | 345/93 |
| 4,936,656 | 6/1990 | Yamashita et al. | 359/49 |
| 5,162,931 | 11/1992 | Holmberg | 359/59 |
| 5,235,447 | 8/1993 | Hepp et al. | 359/54 |

FOREIGN PATENT DOCUMENTS

| | | |
|---|---|---|
| 0 276 853 A2 | 8/1988 | European Pat. Off. |
| 0 411 928 A2 | 2/1991 | European Pat. Off. |
| 0 486 284 A2 | 5/1992 | European Pat. Off. |
| 61-173290 | 8/1986 | Japan . |
| 61-267782 | 11/1986 | Japan . |
| 2-110433 | 4/1990 | Japan . |
| 2-181123 | 7/1990 | Japan . |
| 2-251822 | 10/1990 | Japan . |
| 2-251930 | 10/1990 | Japan . |
| 3-185428 | 8/1991 | Japan . |
| 4-27919 | 1/1992 | Japan . |
| 4-243232 | 8/1992 | Japan . |
| 2015576 | 1/1994 | Russian Federation . |

*Primary Examiner*—William L. Sikes
*Assistant Examiner*—Walter J. Malinowski
*Attorney, Agent, or Firm*—Finnegan, Henderson, Farabow, Garrett & Dunner, L.L.P.

[57] ABSTRACT

An active matrix for liquid crystal displays having a plurality of picture elements, a plurality of address buses, and a plurality of data buses orthogonal to the address buses. Each address bus includes a pair of address subbuses spaced from one another, and each data bus includes a pair of data subbuses spaced from one another. Each picture element includes a pair of display electrodes, and each data subbus is separated from the other by at least one display electrode. Each picture element of an active matrix liquid crystal display includes a pair of display electrodes wherein the position of the pair of display electrodes representing a color on one row of the picture elements is laterally shifted by at least one display electrode with respect to the position of the pair of display electrodes representing a different color on an adjacent row to form a triangular structure representing the color picture element between the adjacent rows.

6 Claims, 4 Drawing Sheets

, 1-n' & 1-n", and through a respective one of the pairs of data subbuses 2-1' & 2-1", 2-2' & 2-2", ..., 2-m' & 2-m".

Further, a lateral electrical link 5 is provided electrically connecting each pair of the data subbuses, e.g., 2-1' and 2-1", dividing the four display electrodes 4I, 4II, 4III and 4IV into a first group of 4I and 4II on one side and a second group of 4III and 4IV on the opposite side. Similarly, a vertical electrical link 6 is provided electrically connecting the pair of the address subbuses, e.g., 1-1" and 1-1", dividing the four display electrodes into a third group of 4I and 4III on one side and a fourth group of 4II and 4IV on the opposite side.

The lateral electrical link 5 is coupled to the source of all of the four TFTs 3I, 3II, 3III and 3IV of each picture element. Therefore, if any of the data subbuses becomes defective, the lateral electrical link 5 will shunt the defective bus, thus securing the supply of the video signals to the TFTs 3 through nondefective parts of the data bus. Likewise, the vertical link 6, if any of the address subbuses becomes defective, secures the supply of the address signal to the TFT 3 through nondefective parts of the address subbus. Further, if any one of the TFTs 3 or any one of the display electrodes 4 becomes defective, only ¼ of the picture element become inoperative, thus, improving the overall operating reliability of the matrix.

However, the matrix of FIG. 2 has drawbacks. Since some of the data subbuses, for example, 2-1" and 2-2', ..., 2-(m-1)" and 2-m' are in close proximity between the picture elements, there exists a high likelihood of these data subbuses being shorted. When such shorting would cause the failure of two adjacent columns of the picture elements during their operation, thus deteriorating the operational reliability of the matrix. Further, the necessity of placing a picture element between the data subbuses and the address subbuses makes it impractical to apply such an active matrix structure for color LCDs having a triangular arrangement of color picture elements.

SUMMARY OF THE INVENTION

The object of the present invention is to eliminate the above-mentioned drawbacks of the conventional matrix.

According to one aspect of the present invention, as embodied and broadly defined herein, the active matrix for liquid crystal displays has a plurality of picture elements, a plurality of address buses, and a plurality of data buses orthogonal to the address buses. Each address bus includes a pair of address subbuses spaced from one another, and each data bus includes a pair of data subbuses spaced from one another. Each picture element includes a pair of display electrodes; a first switching means coupled between each display electrode and a first of the pair of address subbuses of a respective one of the address buses and a respective one of the data buses; and a second switching means coupled between display electrode and a second of the pair of address subbuses of said respective address bus and said respective data bus, wherein each data subbus is separated from the other by at least one display electrode.

According to another aspect of the present invention, the active matrix for liquid crystal displays includes a plurality of picture elements arranged in rows and columns orthogonal to one another. Each picture element represents a respective one of a plurality of colors collectively constituting a color picture element. Each picture element includes at least a pair of display electrodes wherein the position of the pair of display electrodes representing a color on one row of the picture elements is laterally shifted by at least one display electrode with respect to the position of the pair of display electrode representing a different color on an adjacent row to form a triangular structure representing the color picture element between the adjacent rows.

The objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate one embodiment of the invention and together with the description, serve to explain the principles of the invention.

DESCRIPTION OF THE PREFERRED EMBODIMENT

Reference will now be made in detail to the preferred embodiment of the invention, an example of which is illustrated in the accompanying drawings. Wherever possible, the same reference numbers will be used throughout the drawings to refer to the same or like parts.

Figure 1:
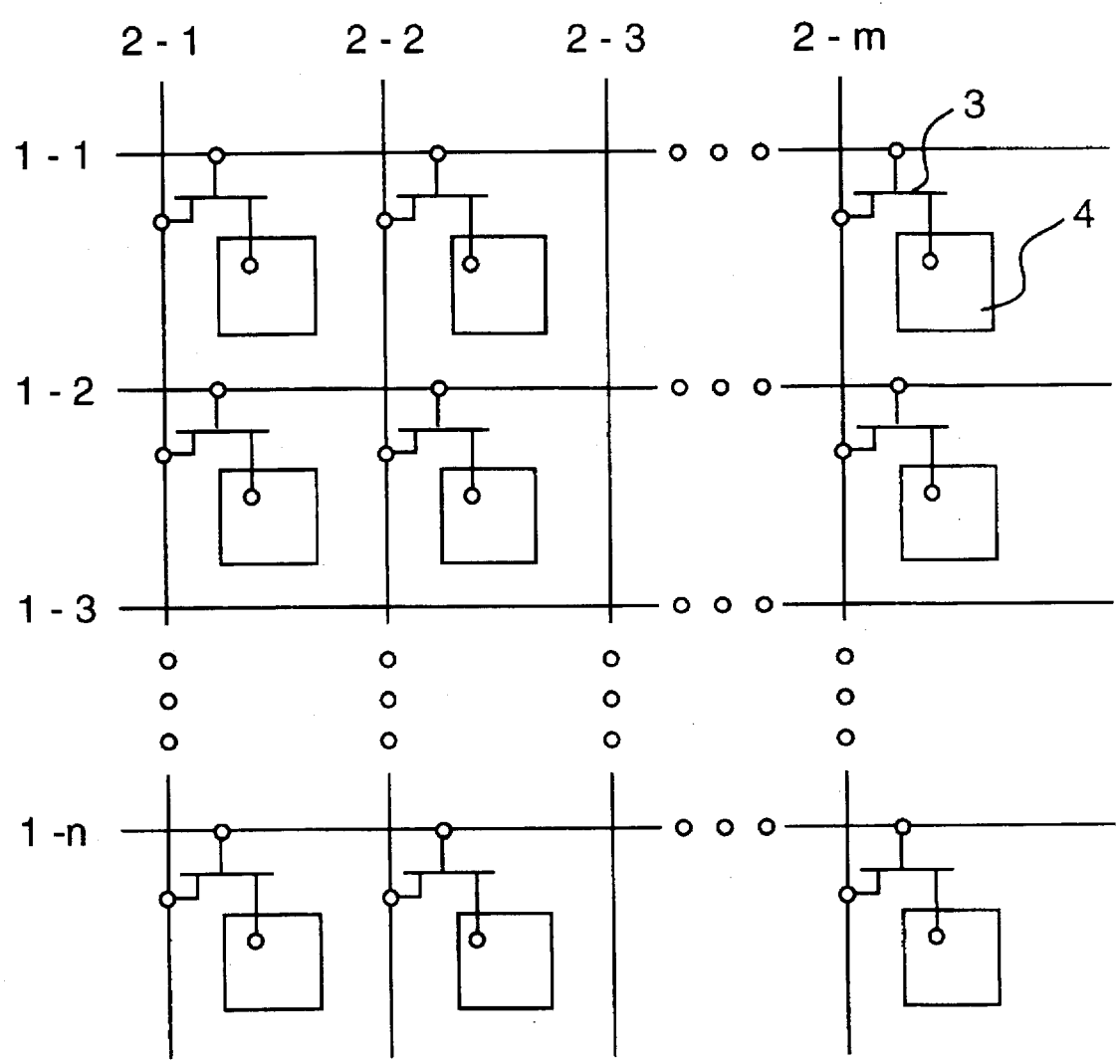
FIG. 1 is the circuitry for a known active matrix LCD.
Figure 2:
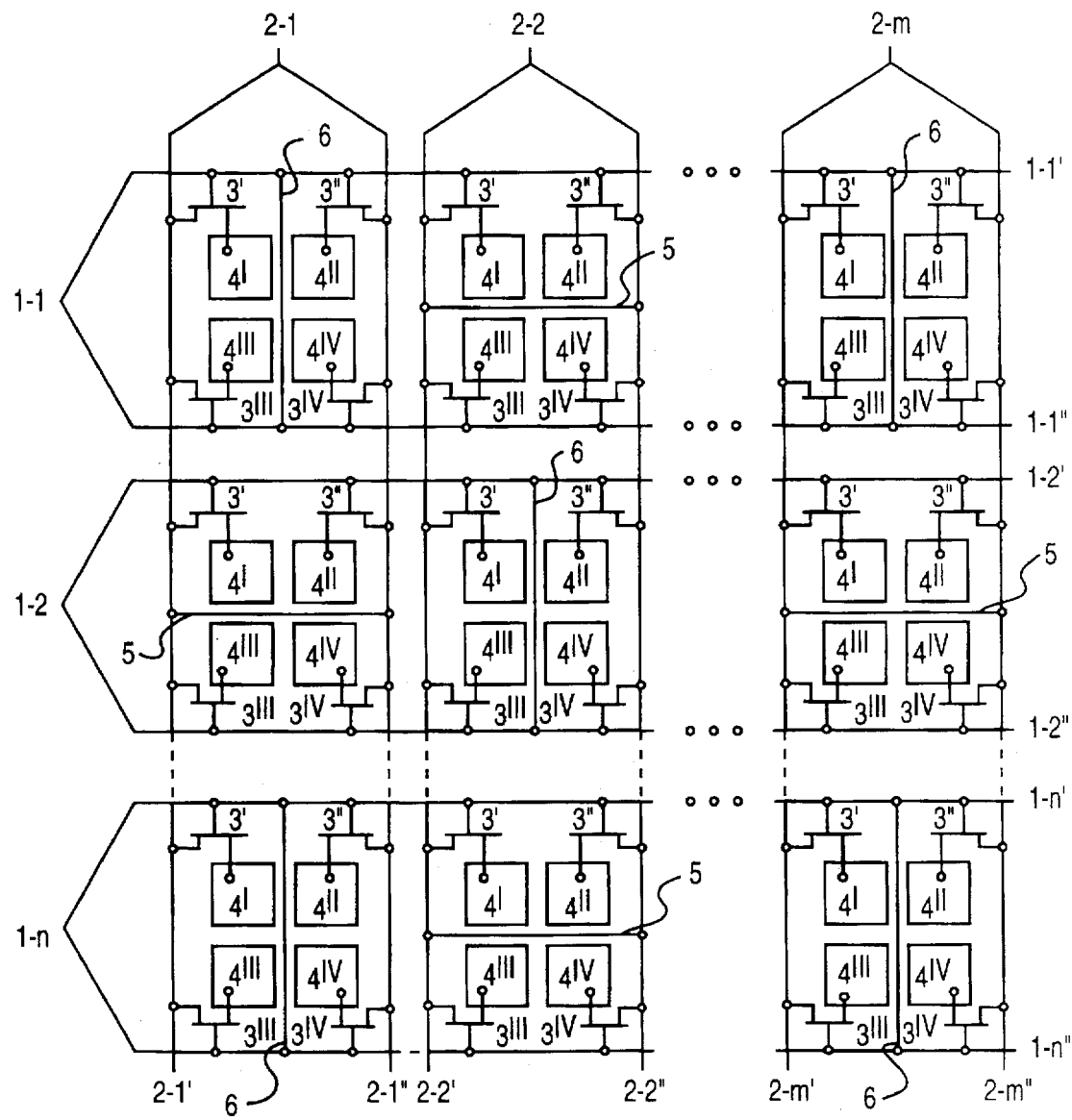
FIG. 2 is the circuitry for another known active matrix LCD with redundancy of matrix elements.
Figure 3:
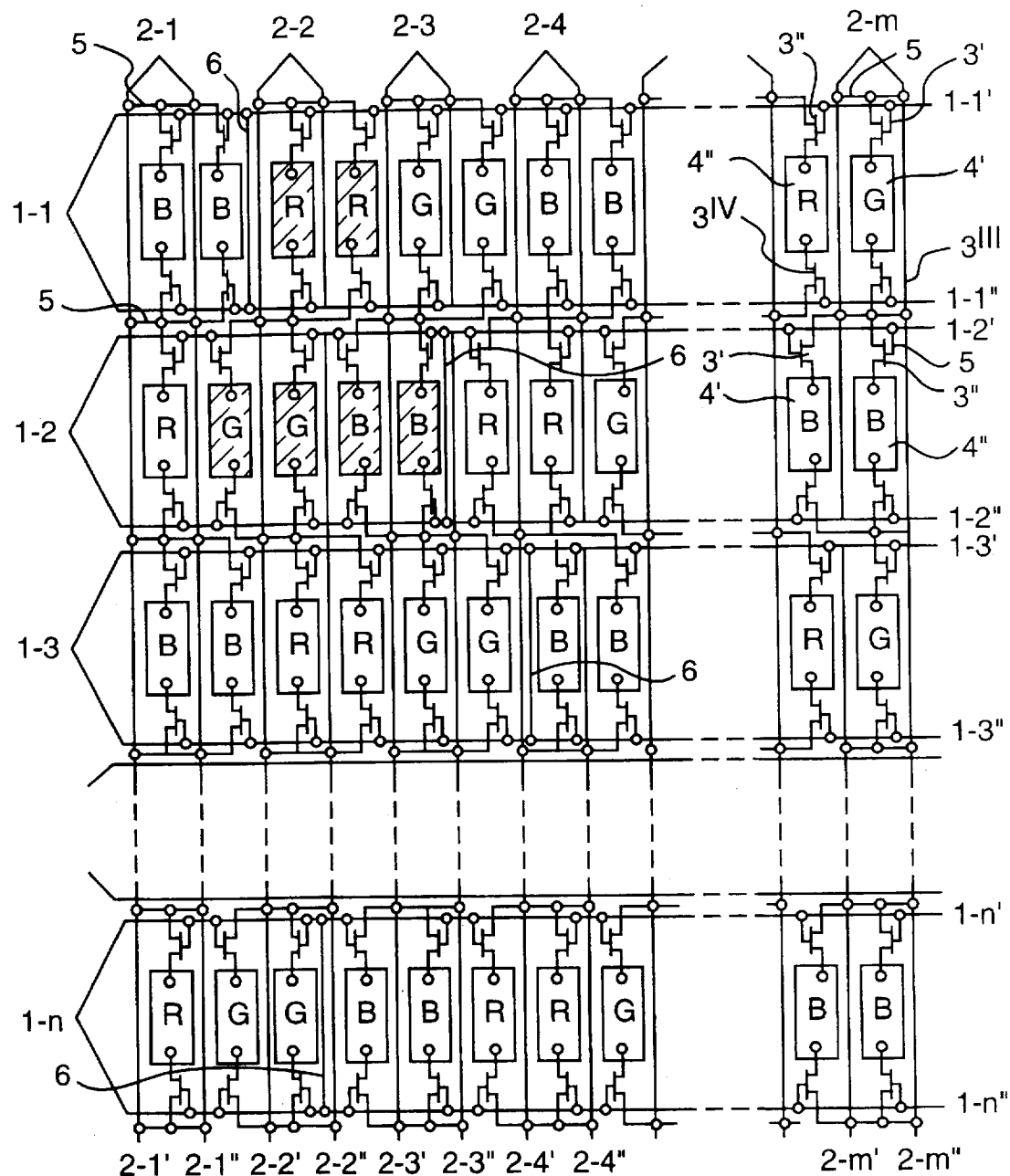
FIG. 3 is the circuit for an active matrix according to an embodiment of the present invention.

FIG. 3 shows the circuitry for an active matrix LCD according to an embodiment of the present invention. The matrix includes a plurality of picture elements in a matrix of n rows and m columns. Each row of the picture elements is repeated every other row. For example, a row 1 (corresponding to the address bus 1-1 in FIG. 3) of the picture elements is repeated in a row 3 (corresponding to the address bus 1-3); a row 2 in a row 4; and a row (n-2) (not shown) in a row n. Each picture element includes first and second display electrodes 4', 4" of an equal shape.

The matrix further includes a plurality of address buses 1-1, 1-2, 1-3, ..., 1-n in parallel with the rows of the picture elements and spaced from one another; and a plurality of data buses 2-1, 2-2, 2-3, 2-4, ..., 2-m in parallel with the columns of the picture elements and equally spaced from one another by a respective one of the display electrode. Each address bus, for example, 1-1, further includes first and second address subbuses 1-1' and 1-1" separated from one another on opposite side of the display electrode of the picture element by a respective one of the display electrode; each data bus, for example, 2-1 includes first and second data subbuses 2-1' and 2-2" separated from one another on opposite sides of the display electrode of the picture element by a respective one of the display electrode.

Each display electrode 4', 4" has two switching transistors 3I & 3III, 3II & 3IV, respectively. The display electrode 4' is coupled to the first address subbus 1-1' through the switching transistor 3I and to the second address subbus 1-1" through the switching transistor 3III; and the display electrode 4" is coupled to the first address subbus 1-1' through the switching transistor 3II and to the second address subbus 1-1" through the switching transistor 3IV.

The drain of each of the four transistors of the picture element is connected to a corresponding display electrode; the gate to a corresponding address subbus; and the source to a corresponding data subbus. The drain and source of the transistor may be interchangeable.

Each picture element is activated simultaneously by a respective one of the pairs of address subbuses 1-1' & 1-1", ..., 1-n' & 1-n" and by a respective one of the pairs of data buses 2-1' & 2-1", ..., 2-m' & 2-m". For each of the pairs of address subbuses, one or more vertical electrical links 6 are provided electrically connecting the pair of address subbuses to secure the supply of the address signal to the transistors when any of the address subbuses becomes defective. Likewise, for each pair of data subbuses, one or more lateral electrical links 5 are provided electrically connecting the pair of data subbuses. The lateral link 5 serves as the source of the switching transistors 3I, 3III in one path and 3II and 3IV in an adjacent path of the picture element.

To eliminate shorting of adjacent data subbuses (or adjacent data buses), each pair of data subbus is separated from the other by a respective one of the two display electrodes 4I, 4II of the picture element. Further, to obtain a triangular disposition of color picture elements of the active matrix, each of the picture elements on one row is shifted laterally relative to a respective one of the picture elements on the adjacent row by a half pitch of the picture element so three picture elements (each including a pair of display electrodes) corresponding to color elements R, G, and B constitute a triangular structure, as shown by an hatched area in FIG. 3.

Figure 4:
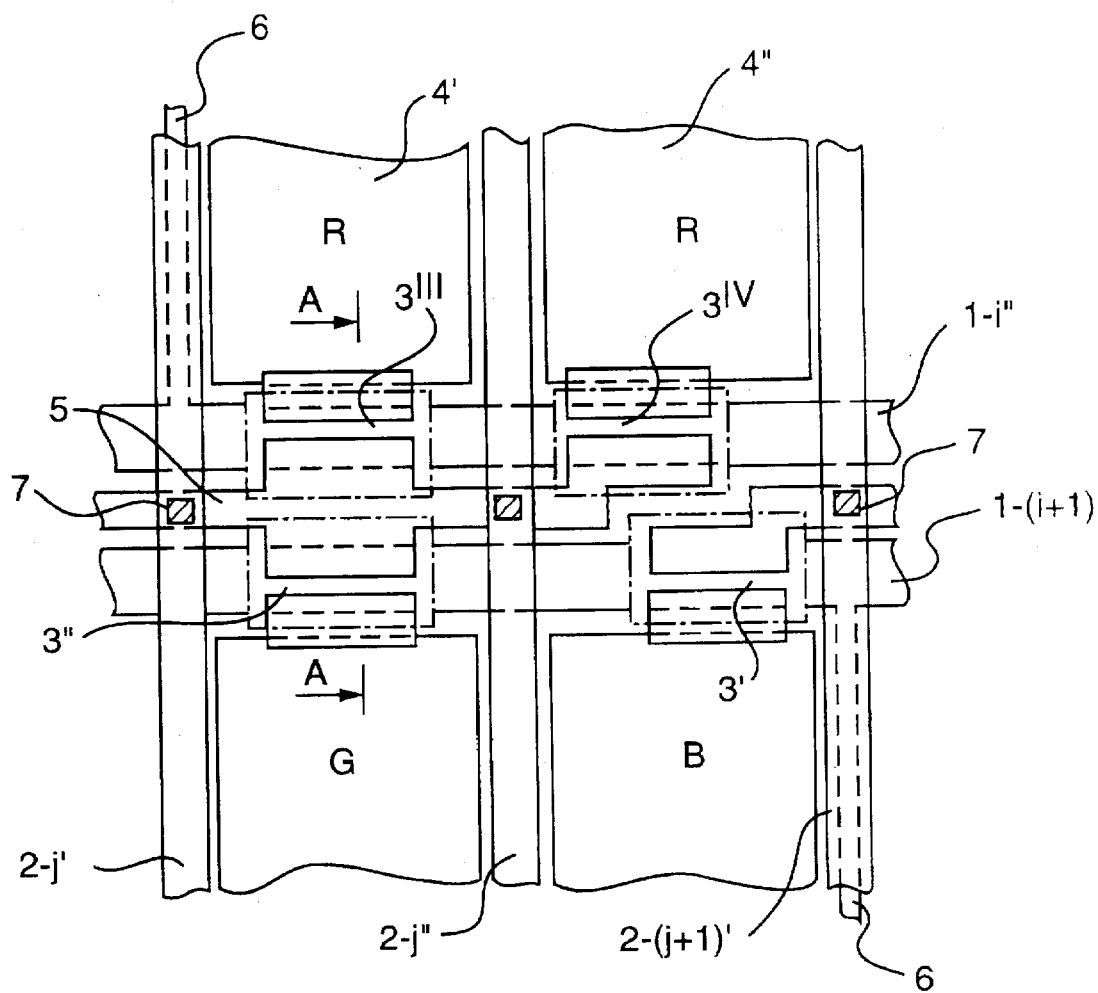
FIG. 4 is a plan view of the layout of a portion of the active matrix LCD of FIG. 3.

FIG. 4 shows a plan view of the layout of a portion of the active matrix of FIG. 3 with electrical links 5 and 6 and with switching transistors disposed between the data subbuses of j-th and (j+1)th columns. Dashed-dotted lines refer to the semiconductor regions of the switching transistors 3I, 3II, 3III and 3IV performed from a-silicon. The address subbuses 1-i" and 1-(i+1)' serve as the gates of the switching transistors, while the electrical links 5 serve as sources of the transistors 3II and 3III. The electrical links 5 and the sources of the transistors 3I and 3IV are connected with the data buses 2-j', 2-j" and 2-(j+1)' by means of contacts 7.

Figure 5:
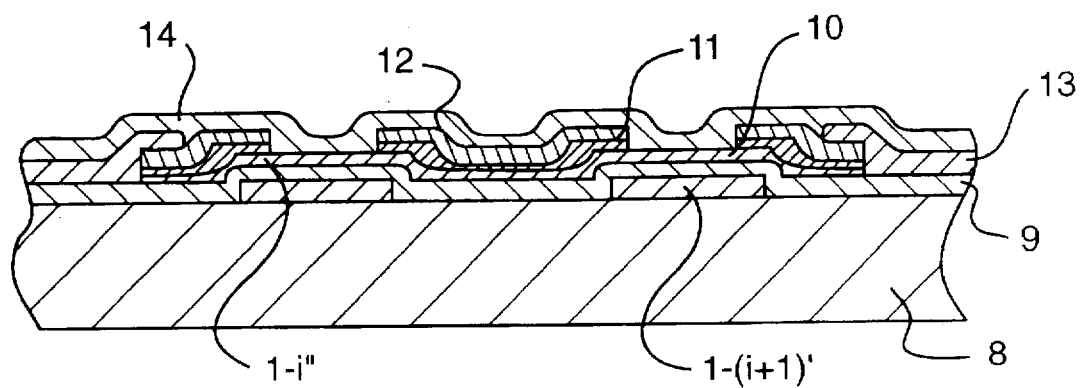
FIG. 5 is a sectional view taken along A—A of FIG. 4.

FIG. 5 shows a sectional view of the layout of FIG. 4 taken along A—A. The manufacturing process is explained below in reference to FIG. 5. A chromium film was formed on a glass substrate 8 by vacuum evaporation. The address subbuses 1-i" and 1-(i+1)' and the electric link 6 were formed photolithographically from this film. These subbuses serve simultaneously as the gates of the switching transistors. Then, silicon nitride 9 was sputtered to form a gate dielectric. An a-silicon film 10 was deposited over the gate dielectric from which the semiconductor regions of the switching transistors were formed photolithographically.

Then $N^+$a-Si:H 11 and chromium 12 films were deposited successively and the source and drain regions of the switching transistors as well as the electric link 5 (FIG. 4) were formed photolithographically and selective etching from these films. Thereafter, a transparent conductive film 13 of indium oxide was deposited and the display electrodes were formed photolithographically from this film. Then, a silicon nitride film 14, serving as a protective dielectric, was deposited and the contact windows to the electrical links and to the sources of the switching transistors were opened in this film. Then, an aluminium film was deposited from which the data subbuses (not shown in the figure) were formed photolithographically.

The active matrix for LCDs of the present invention, as embodied herein, has a special feature in that each picture element in the matrix includes at least two display electrodes and each display electrode has two switching transistors associated therewith. Each address bus associated with a picture element has a pair of subbuses separated from one another by the display electrode. Each data bus has a pair of data subbuses, and each data subbuses is separated from the other by the display electrode of the picture elements.

The drain of each switching transistor in each picture element is connected to a corresponding display electrode; the gate to a corresponding address subbus, and the source to a corresponding data subbus. For each pair of address subbuses, one or more vertical electrical links each electrically connecting the pair are provided serving as the gate of the associated switching transistors. Likewise, for each pair of data subbuses, one or more lateral electrical links each electrically connecting the pair of data subbuses are provided serving as the source of the associated switching transistors.

According to another aspect of the present invention, each row of the picture elements is repeated every other row. Each of the picture elements on each row are shifted relative to a respective one of the picture elements on the adjacent row by a half pitch of the picture element to facilitate the construction of a triangular pattern of color picture elements. Therefore, with the active matrix structure of the present invention, shorting between the adjacent data buses is avoided, and application for color LCDs becomes easier.

It will be apparent to those skilled in the art that various modifications and variations can be made in the camera and method of the present invention without departing from the spirit or scope of the invention. Thus, it is intended that the present invention cover the modifications and variations of this invention provided they come within the scope the appended claims and their equivalents.

What is claimed is:

1. An active matrix for liquid crystal displays having a plurality of picture elements, a plurality of address buses, and a plurality of data buses orthogonal to the address buses, each address bus including a pair of address subbuses spaced from one another, each data bus including a pair of data subbuses spaced from one another, each picture element compromising:

a single pair of display electrodes, a first switching means coupled between each display electrode and a first of the pair of address subbuses of a respective one of the address buses and a respective one of the data buses; and a second switching means coupled between each display electrode and a second of the pair of address subbuses of said respective address bus and said respective data bus, wherein each data subbus of the pair is separated from the other data buses by at least one display electrode.

2. The active matrix of claim 1, wherein the pair of data subbuses of each data bus includes one or more means for electrically connecting one another.

3. The active matrix of claim 1, wherein the pair of address subbuses of each address bus includes one or more means for electrically connecting one another.

4. An active matrix for liquid crystal displays, comprising:

a plurality of picture elements arranged in rows and columns, each picture element representing a respective one of a plurality of colors collectively constituting a color picture element, each picture element consisting of a single pair of display electrodes, wherein the position of said pair of display electrodes representing each color on one row of the picture elements is laterally shifted by at least one such display electrode with respect to the position of the pair of display electrodes representing a different color on an adjacent row to form a triangular structure representing the color picture element between the adjacent rows;

a plurality of address buses, each including a pair of address subbuses;

a plurality of data buses, each including a pair of data subbuses, wherein each data subbus of the pair is separated from the other data buses by at least one display electrode; and a first switching element coupled to each display electrode of the pair of display electrodes, a first of the pair of address subbuses of a respective one of the address buses, and a respective one of the data buses; and a second switching element coupled to each display electrode of the pair of display electrodes, a second of the pair of address subbuses of said respective one of the address buses and said respective one of the data buses.

5. The active matrix of claim 4, wherein the pair of data subbuses of each data bus includes one or more means for electrically connecting one another.

6. The active matrix of claim 4, wherein the pair of address subbuses of each address bus are spaced from one another and include one or more means for electrically connecting one another.

* * * * *